United States Patent
Shinozaki

(10) Patent No.: US 8,837,504 B2
(45) Date of Patent: Sep. 16, 2014

(54) RELAY APPARATUS AND OUTPUT CONTROL METHOD

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 810 days.

(21) Appl. No.: 12/614,152

(22) Filed: Nov. 6, 2009

(65) Prior Publication Data

US 2010/0054270 A1    Mar. 4, 2010

Related U.S. Application Data

(63) Continuation of application No. PCT/JP2007/060379, filed on May 21, 2007.

(51) Int. Cl.
| | | |
|---|---|---|
| *H04L 12/28* | (2006.01) | |
| *H04L 12/861* | (2013.01) | |
| *H04L 12/835* | (2013.01) | |
| *H04L 12/869* | (2013.01) | |
| *H04L 12/863* | (2013.01) | |
| *H04L 12/801* | (2013.01) | |
| *H04L 12/823* | (2013.01) | |

(52) U.S. Cl.
CPC ........... *H04L 47/30* (2013.01); *H04L 49/90* (2013.01); *H04L 47/58* (2013.01); *H04L 49/9078* (2013.01); *H04L 47/6245* (2013.01); *H04L 47/12* (2013.01); *H04L 47/32* (2013.01); *H04L 47/10* (2013.01)
USPC ........... 370/418; 370/412; 370/413; 370/414; 370/415; 370/416; 370/417

(58) Field of Classification Search
CPC ......... H04L 47/30; H04L 47/58; H04L 47/32; H04L 47/12; H04L 47/10; H04L 47/6245; H04L 49/9078; H04L 49/90
See application file for complete search history.

(56) References Cited

U.S. PATENT DOCUMENTS 7,149,291 B1 * 12/2006 Deshpande .............. 379/112.01
7,434,023 B2 10/2008 Nodomi et al.
(Continued)

FOREIGN PATENT DOCUMENTS

| JP | 2006140984 A | 6/2006 |
|---|---|---|
| JP | 2006245732 | * 9/2006 |

(Continued)

OTHER PUBLICATIONS

Japanese Office Action dated Oct. 18, 2011 issued is application No. 2009-515043.

(Continued)

*Primary Examiner* — Faruk Hamza
*Assistant Examiner* — Aixa A Guadalupe-Cruz
(74) *Attorney, Agent, or Firm* — Smith, Gambrell & Russell, LLP

(57) ABSTRACT

A buffer temporarily stores data received from a network by a receiving unit. An output mode switching unit switches the mode in which the data received by the receiving unit is output to the buffer, between FIFO and FILO, in accordance with the storage amount of data temporarily stored in the buffer. For example, if the data temporarily stored in the buffer falls below a given threshold value of the buffer, data is stored in the buffer in FIFO. If the data temporarily stored in the buffer exceeds a given threshold value of the buffer, data is stored in the buffer in FILO. A sending unit outputs data taken from the buffer in FIFO or FILO, to a network.

6 Claims, 13 Drawing Sheets

(56) References Cited

U.S. PATENT DOCUMENTS

| | | | |
|---|---|---|---|
| 7,584,472 B1 * | 9/2009 | McCormick et al. | ......... 718/100 |
| 2003/0120705 A1 | 6/2003 | Chen et al. | |
| 2003/0227933 A1 | 12/2003 | Eberle et al. | |
| 2006/0109870 A1 | 5/2006 | Miyaji et al. | |

FOREIGN PATENT DOCUMENTS

| | | | |
|---|---|---|---|
| JP | 2006245732 A | 9/2006 | |
| JP | 200734643 A | 2/2007 | |

OTHER PUBLICATIONS

International Search Report dated Aug. 21, 2007 received in PCT/JP2007/060379.

European Office Action dated Aug. 16, 2011 for application No. 07 743 813.3-1249.

R. Beraldi and S. Marano "Limiting Removal Depth in the Pushout Scheme for ATM Networks"; pp. 0997-1003; 335A.3.1, 1992.

Extended European Search Report dated Sep. 16, 2010 received in Application No./Patent No. 07743813.3-1249/ 2161888 PCT/JP2007060379.

* cited by examiner

RELAY APPARATUS AND OUTPUT CONTROL METHOD

CROSS-REFERENCE TO RELATED APPLICATION

This is a continuation of application PCT/JP2007/060379, filed on May 21, 2007, now pending, the contents of which are herein wholly incorporated by reference.

FIELD

The present invention relates to relay apparatuses and output control methods for relaying data on a network.

BACKGROUND

In a relay apparatus on a network, concentration of traffic or the like causes congestion. Especially, in wireless networks, congestion is likely to occur because of increased real-time streaming services and a narrower band of transmission channel in comparison with wired networks. The representative systems of wireless networks include the wireless LAN (IEEE 802.11) and cellular (3rd Generation Partnership Project (3GPP)).

Figure 10:
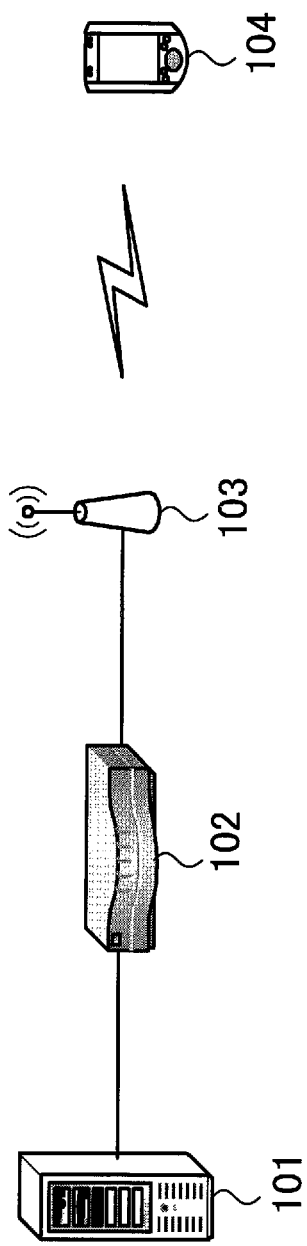

FIG. 10 is a view illustrating an example structure of a wireless LAN system. As illustrated in FIG. 10, the wireless LAN includes a media server 101, a wireless network gateway 102, an access point (AP) 103, and a wireless terminal 104.

The media server 101 stores video data for providing a real-time streaming service for the wireless terminal 104, for example. The data stored in the media server 101 is delivered through the wireless network gateway 102 and the AP 103, to the wireless terminal 104.

Figure 11:
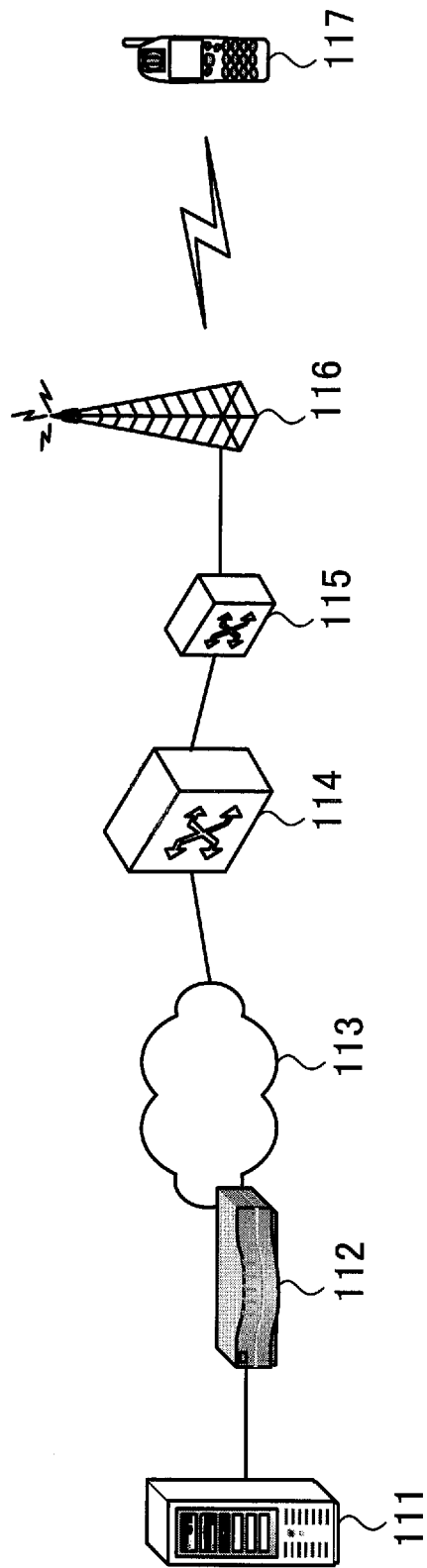

FIG. 11 is a view illustrating an example structure of a cellular network. As illustrated in FIG. 11, the cellular network includes a media server 111, a gateway 112, the Internet 113, a serving/gateway general packet radio service support node (xGSN) 114, a radio network controller (RNC) 115, a base station 116, and a wireless terminal 117.

The media server 111 stores video data for providing a real-time streaming service for the wireless terminal 117, for example. The data stored in the media server 111 is delivered through the gateway 112, the Internet 113, the xGSN 114, the RNC 115, and the base station 116, to the wireless terminal 117.

In multimedia services, or especially in video services, distribution on the Internet or the like places a large load on the network, and a massive amount of video data puts great pressure on the storage. To avoid these problems, the video data is compressed by a compression coding method, as typified by MPEG1 or MPEG2, for example. Coding methods for 3G cellular phones include H.263 and H.264. H.264 was a newly proposed coding method allowing the compression rate to be changed in a wide band from the Quad Common Intermediate Format (QCIF) level to the high definition (HD) level and was integrated with the Advanced Video Coding (AVC), which is part 10 of MPEG-4, to provide H.264/AVC.

If the media server delivers streaming data to a wireless terminal, a relay apparatus such as a wireless network gateway relays data from the media server and sends the data to the wireless terminal. If the wireless network gateway resends data in a wireless section because of degraded wireless quality, the data received from the media server waits to be transmitted, causing a data jam.

If a plurality of wireless terminals request communication with a wireless network in the same period, congestion occurs, limiting wireless resources (such as time) that can be used by the terminals and causing a data jam in the wireless network gateway. If different channels are used in the 3GPP, for example, the relay apparatus is not affected by the simultaneous access of the wireless terminals. In High Speed Downlink Packet Access (HSDPA), since a channel is shared, a data jam will occur. In the wireless LAN, because of the shared channel and half-duplex communication, data transmission opposite in direction to streaming data transmission will also be affected.

Figure 12:
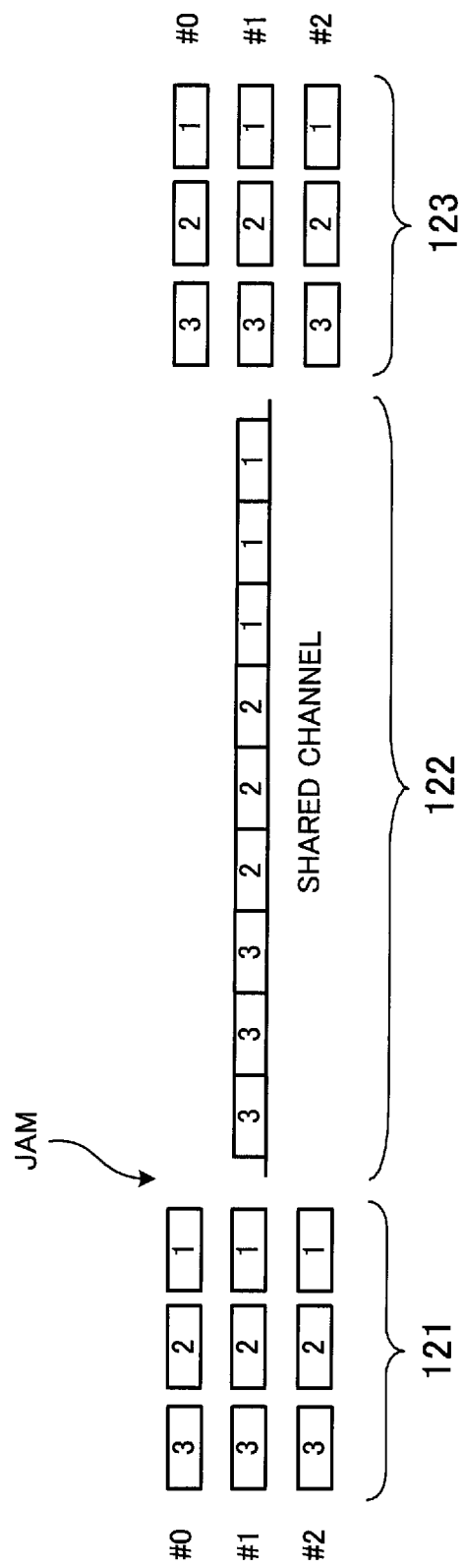

FIG. 12 is a view illustrating a data jam. Data 121 in FIG. 12 is data a relay apparatus such as a wireless network gateway, for example, receives from a media server. Data 122 indicates a data transmission state in a wireless section. Data 123 indicates data received by wireless terminals.

The relay apparatus receives data sent from the media server to the wireless terminals #0 to #2, as indicated by the data 121. Because the wireless section is a shared channel, transmission data contention occurs. Therefore, the output of the relay apparatus will cause a data jam.

Figure 13:
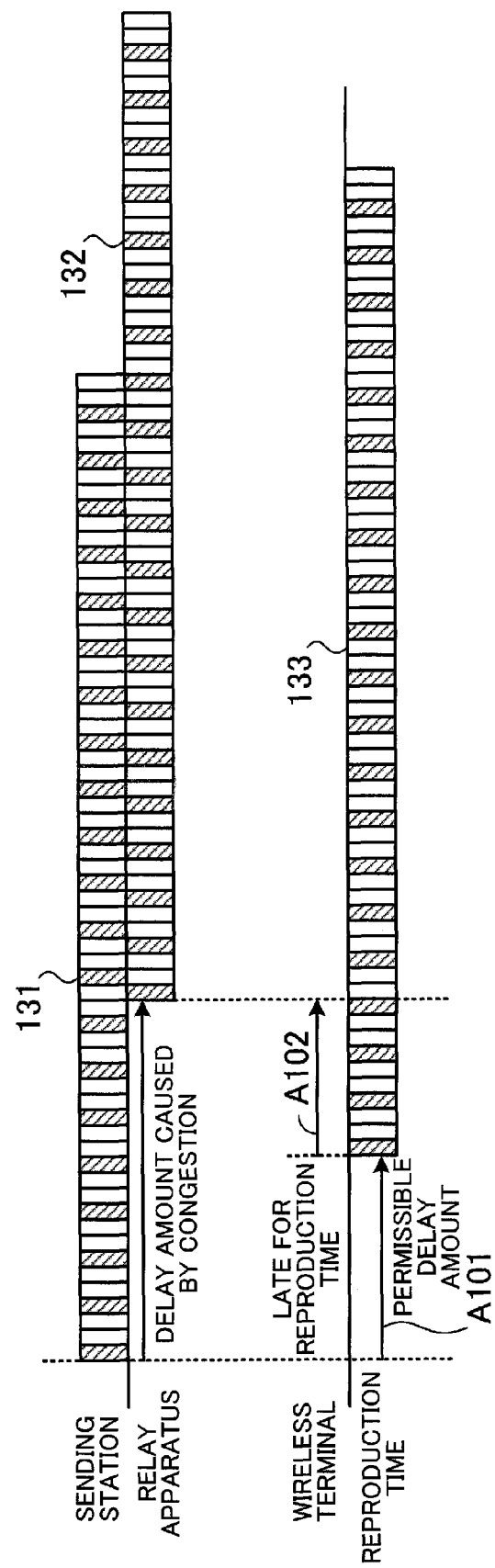

FIG. 13 is a view illustrating restrictions on video data reproduction. Data 131 in FIG. 13 indicates data sent by a sending station, which is a media server. Data 132 indicates data sent from a relay apparatus to a wireless terminal, by relaying the data 131 of the sending station. The data 132 sent from the relay apparatus to the wireless terminal has been delayed by congestion, in comparison with the data 131 sent by the sending station. Shaded parts of the data 131 to 133 indicate reference pictures, and non-shaded parts indicate non-reference pictures.

The data 133 reaches the wireless terminal at the timing when the data can be reproduced appropriately. The wireless terminal can reproduce the data 131 sent by the sending station appropriately in real time if it can receive the data 131 of the sending station within the range of a permissible delay amount indicated by an arrow A101 in FIG. 13.

The data 132 relayed and sent by the relay apparatus is sent with a delay exceeding the permissible delay amount, as shown in FIG. 13. Therefore, the data 132 received by the wireless apparatus is late for the reproduction time, by the period of time indicated by an arrow A102 in FIG. 13.

A transmission apparatus and a transmission program that control media data transmission of one party without affecting delay changing in media data transmission of the other party have already been provided (refer to Japanese Laid-open Patent Publication No. 2006-140984, for example).

SUMMARY

Data that is required to be real time have restrictions on the reproduction time in the receiving apparatus, and data that has not arrived within a predetermined period of time is discarded as meaningless data in the receiving apparatus. If a data jam continues in the relay apparatus, jitter delay increases, causing data that has become irrelevant to reproduction in the receiving apparatus to be sent continuously. Accordingly, the receiving apparatus is continuously unable to reproduce data.

Figure 1:
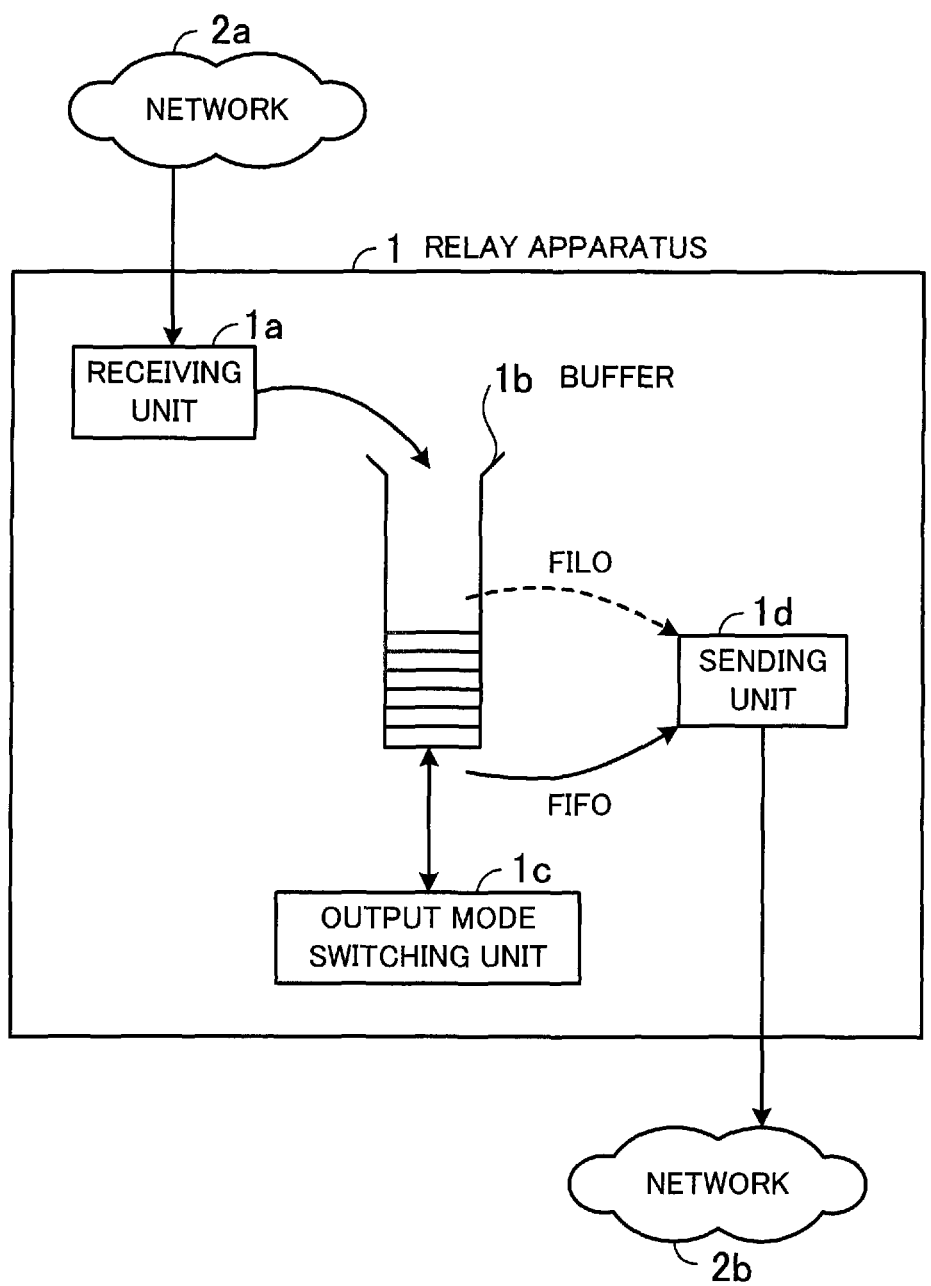

According to a certain aspect of the present invention, a relay apparatus 1 relays data on networks 2a and 2b as illustrated in FIG. 1. This relay apparatus includes the following elements: a buffer 1b for storing data temporarily and an output mode switching unit 1c configured to switch the mode in which data is output to the buffer 1b in accordance with the amount of data temporarily stored in the buffer 1b (between First In First Out (FIFO) and First In Last Out (FILO), for example).

In the relay apparatus 1, the data output mode of the buffer 1b is switched between FIFO and FILO, for example, in accordance with the amount of data temporarily stored in the buffer 1b.

The objects and advantages of the invention will be realized and attained by means of the elements and combinations particularly pointed out in the claims.

BRIEF DESCRIPTION OF DRAWING(S)

Figure 2:
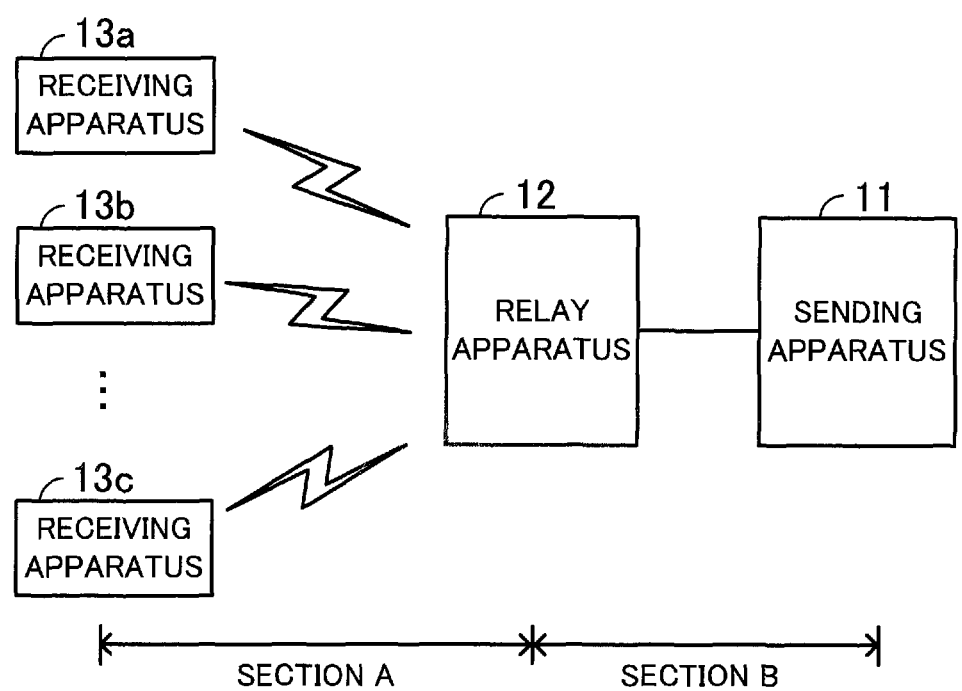
Figure 3:
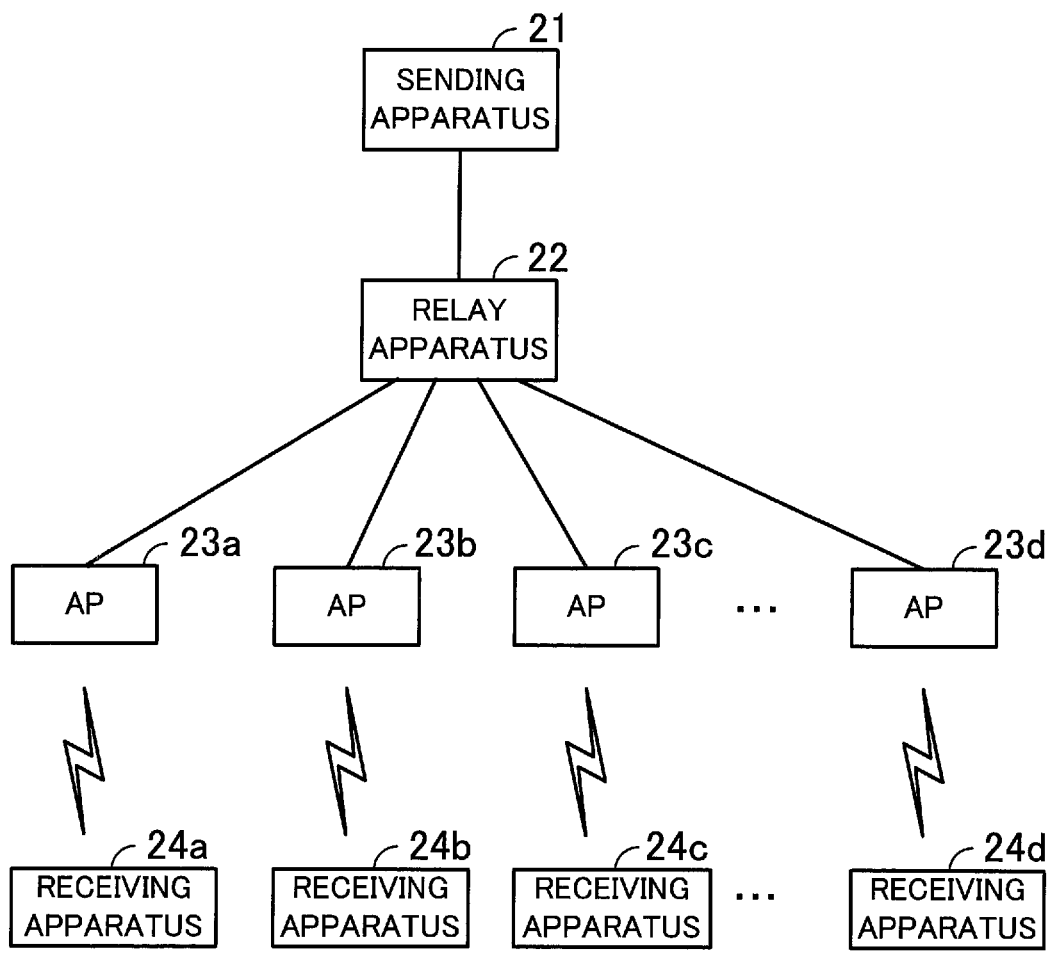
Figure 4A:
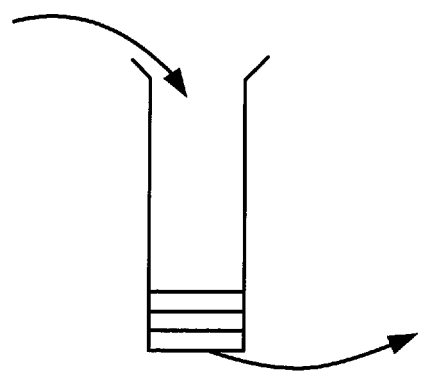
Figure 4B:
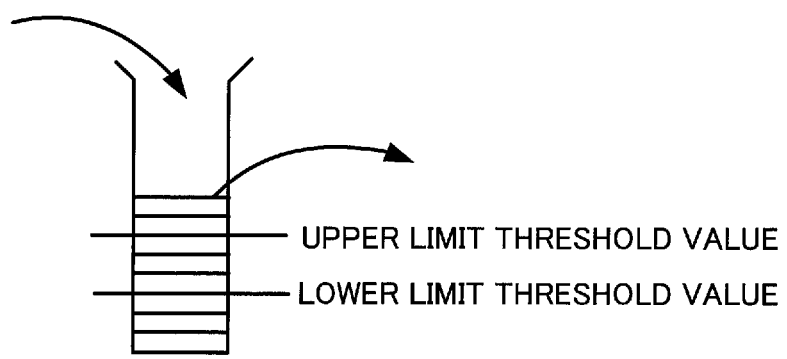
Figure 5:
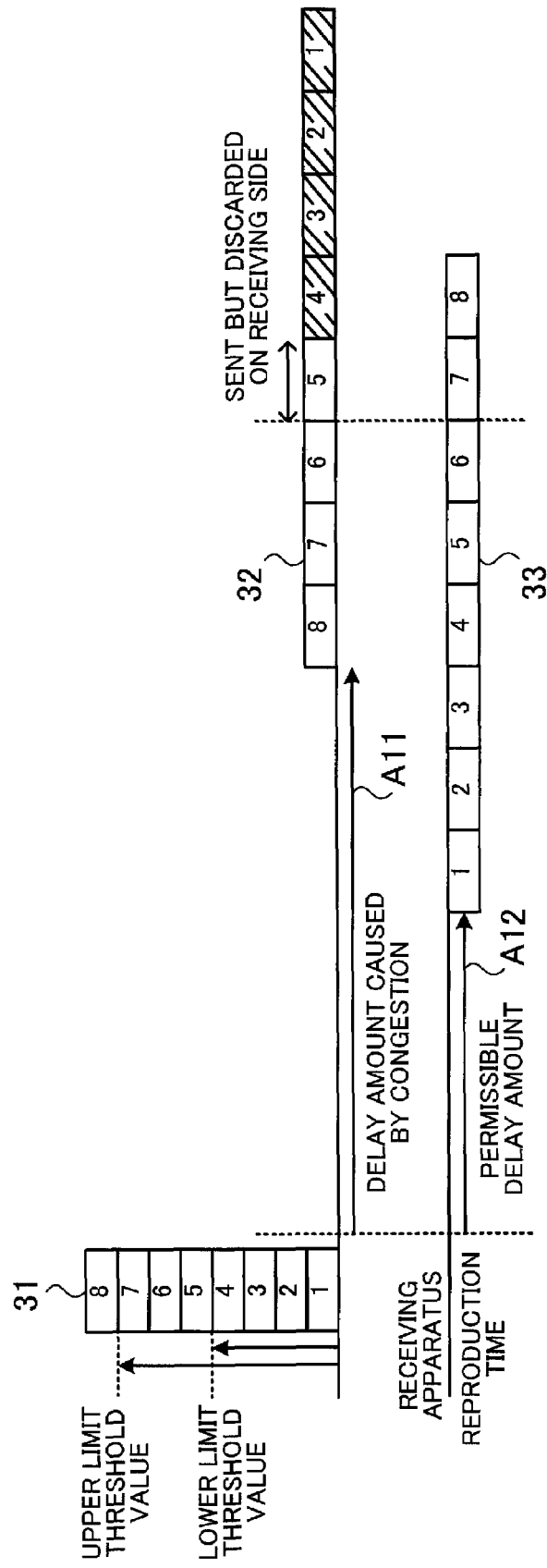
Figure 6:
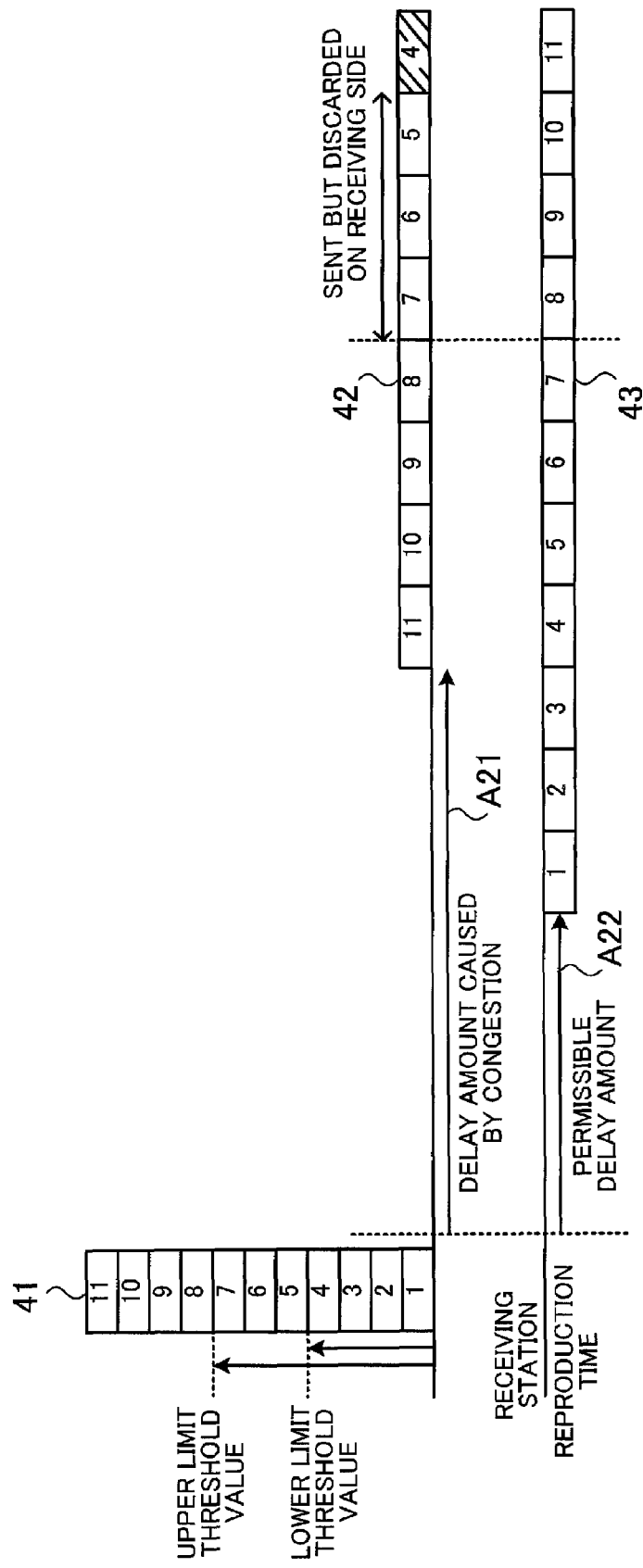
Figure 7:
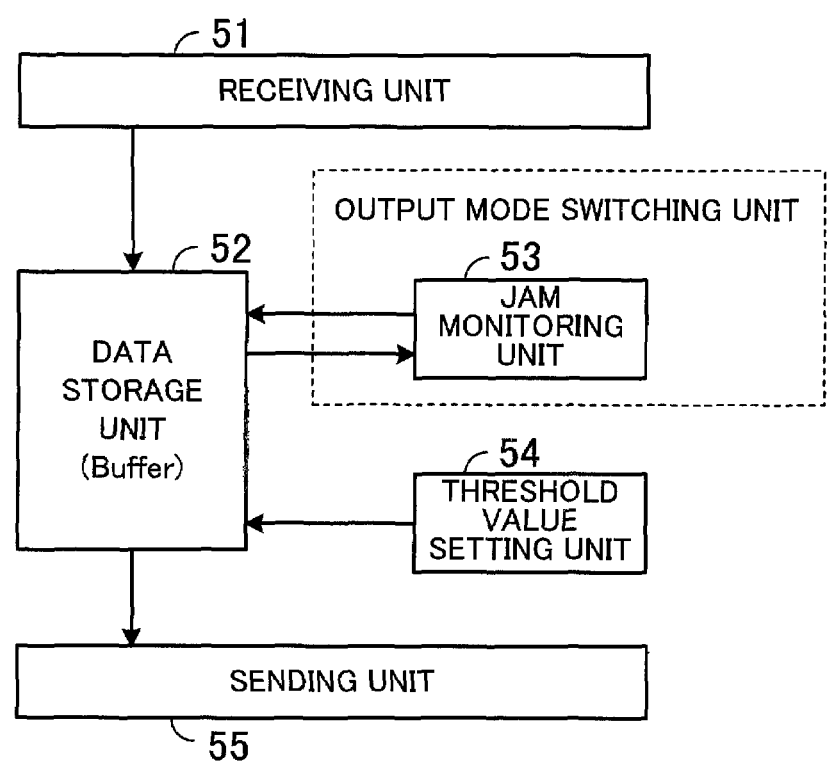
Figure 8:
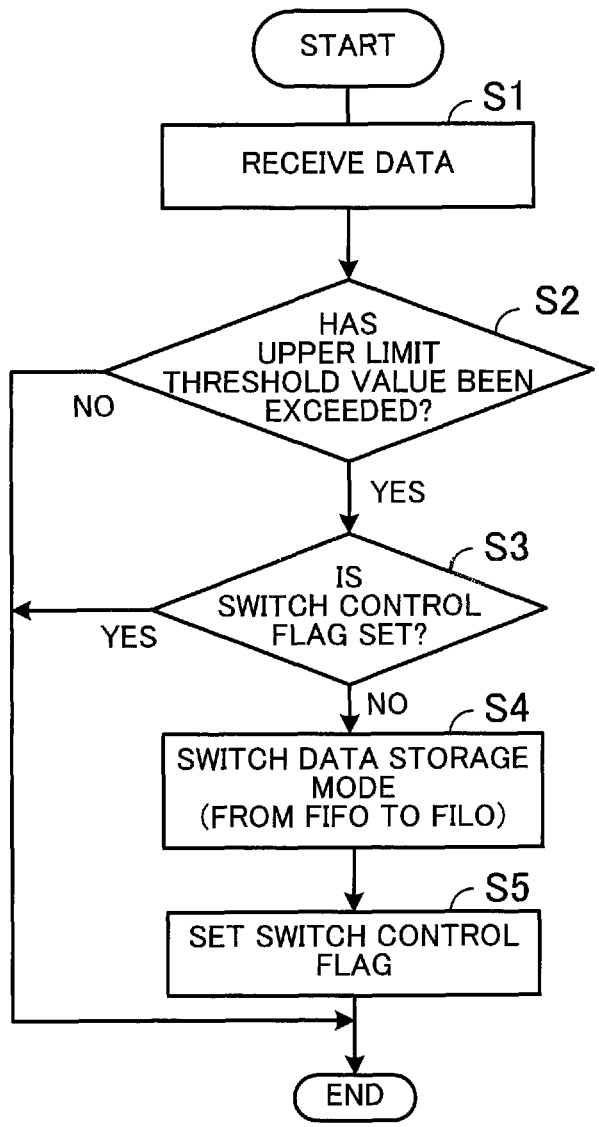
Figure 9:
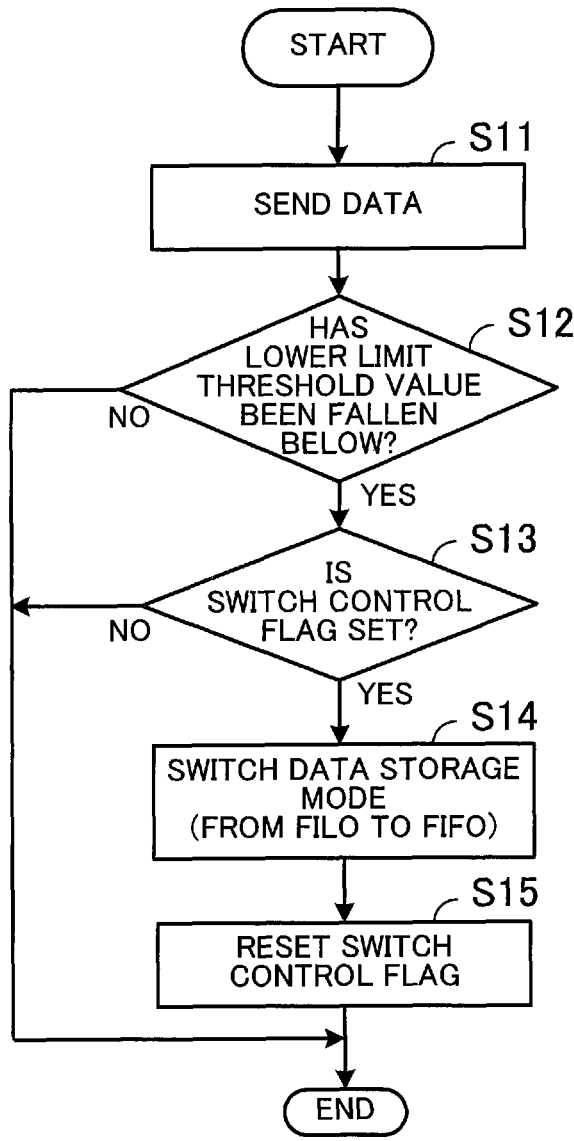

FIG. 1 is a view illustrating a relay apparatus;
FIG. 2 is a view illustrating an example of a network structure where a relay apparatus of the present invention is adopted;
FIG. 3 is a view illustrating another example of a network structure where a relay apparatus of the present invention is adopted;
FIG. 4 is a view explaining a buffer of the relay apparatus;
FIG. 5 is a view illustrating the discarding of data;
FIG. 6 is another view illustrating the discarding of data;
FIG. 7 is a block diagram of the relay apparatus;
FIG. 8 is a flowchart illustrating an operation of switching the buffer data output mode when data is received;
FIG. 9 is a flowchart illustrating an operation of switching the buffer data output mode when data is sent;
FIG. 10 is a view illustrating an example structure of a wireless LAN system;
FIG. 11 is a view illustrating an example structure of a cellular network;
FIG. 12 is a view illustrating a data jam; and
FIG. 13 is a view illustrating restrictions on video data reproduction.

DESCRIPTION OF EMBODIMENT(S)

The embodiment of the disclosures made herein will be described below referring to the drawings in detail.

FIG. 1 is a view illustrating a relay apparatus. The relay apparatus 1 in FIG. 1 relays real-time data such as streaming data from a media server connected to a network 2a, for example, and sends the data to a receiving apparatus connected to a network 2b. The network 2a is a wired network, for example, and the network 2b is a wireless network, for example. The relay apparatus 1 includes a receiving unit (receiver) 1a, a buffer 1b, an output mode switching unit (switching controller) 1c, and a sending unit (transmitter) 1d.

The receiving unit 1a receives the data from the network 2a.

The buffer 1b stores temporarily the data received by the receiving unit 1a.

The output mode switching unit 1c switches the mode in which the data received by the receiving unit 1a is output to the buffer 1b (between FIFO and FILO, for example), in accordance with the amount of data stored temporarily in the buffer 1b. For example, if the data stored temporarily in the buffer 1b falls below a given threshold value of the buffer 1b, data is stored in the buffer 1b in FIFO. If the data stored temporarily in the buffer 1b exceeds a given threshold value of the buffer 1b, data is stored in the buffer 1b in FILO. The operation can also be switched to output data in the chronological order, oldest first, when the amount of stored data does not exceed the threshold value, or to send data newer than the oldest data (data received after the oldest data) when the amount of stored data exceeds the threshold value.

The sending unit 1d outputs data taken from the buffer 1b in FIFO or FILO, to the network 2b.

Depending on the data congestion state of the network 2b, data to be sent to the receiving apparatus can jam in the buffer 1b. If the taking of data from the buffer 1b is continued in FIFO, old data that cannot be reproduced by the receiving apparatus is sent continuously, leaving the receiving apparatus continuously unable to reproduce data.

If data stored in the buffer 1b exceeds a given threshold value, the relay apparatus 1 switches the data output mode to FILO, for example. This causes new data temporarily stored in the buffer 1b to be sent to the receiving apparatus, avoiding the continuation of inability to reproduce data in the receiving apparatus. The old data that is temporarily stored in the buffer 1b and cannot be reproduced is discarded.

The relay apparatus 1 switches the data output mode of the buffer 1b between FIFO and FILO in accordance with the amount of data temporarily stored in the buffer 1b. This makes it possible to avoid the continuation of inability to reproduce data in the receiving apparatus that receives data.

An embodiment of the present invention will be described next in detail with reference to the drawings.

FIG. 2 is a view illustrating an example of a network structure where a relay apparatus of the present invention is adopted. FIG. 2 indicates a sending apparatus 11, a relay apparatus 12, and receiving apparatuses 13a to 13c.

The sending apparatus 11 stores video data for providing a real-time streaming service for the receiving apparatuses 13a to 13c, for example. The relay apparatus 12 relays data sent from the sending apparatus 11 and sends the data to the receiving apparatuses 13a to 13c.

In section B between the sending apparatus 11 and the relay apparatus 12, a wired connection is made, for example. In section A between the relay apparatus 12 and the receiving apparatuses 13a to 13c, a wireless connection is made, for example. Even if the transmission quality in section A changes, changing the transmittable band, the relay apparatus 12 relays data, avoiding the continuation of inability to reproduce data and suppressing the period of influence of the inability.

FIG. 3 is a view illustrating another example of a network structure where a relay apparatus of the present invention is adopted. FIG. 3 indicates a sending apparatus 21, a relay apparatus 22, APs 23a to 23d, and receiving apparatuses 24a to 24d.

The sending apparatus 21 stores video data for providing a real-time streaming service for receiving apparatuses 24a to 24d, for example. The relay apparatus relays data sent from the sending apparatus 21 and sends the data to the APs 23a to 23d. The APs 23a to 23d send the data received from the relay apparatus 22 down to the receiving apparatuses 24a to 24d by radio. Even if the transmission quality between the APs 23a to 23d and the receiving apparatuses 24a to 24d change, changing the transmittable band, the relay apparatus 22 relays data, avoiding the continuation of the inability to reproduce data and suppressing the period of influence of the inability.

The sending apparatuses 11 and 21 indicated in FIGS. 2 and 3 are media servers, for example. The relay apparatuses 12 and 22 are apparatuses such as a wireless network gateway, router, or RNC. The relay apparatuses 12 and 22 need to be disposed in any places where real-time data of the sending apparatus can be relayed in the wired network, and those places are not limited to the positions indicated in FIGS. 2 and 3. The apparatuses are not limited to a wireless network gateway, router, or RNC, for example.

The relay apparatus 12 will be described in detail. The relay apparatus 22 has the same function as the relay apparatus 12, and just the relay apparatus 12 will be explained.

FIG. 4 is a view explaining the buffer of the relay apparatus. The buffer function of a conventional relay apparatus is illustrated at (A) in FIG. 4, and the buffer function of the relay apparatus 12 is illustrated at (B) in FIG. 4.

As shown at (A) in FIG. 4, the conventional relay apparatus temporarily holds real-time data sent from the sending apparatus in FIFO. In contrast, the relay apparatus 12 switches the data output mode between FIFO and FILO in accordance with the amount of data temporarily stored in the buffer.

The relay apparatus 12 has two threshold values for switching the data output mode between FIFO and FILO, as illustrated at (B) in FIG. 4. One is a lower limit threshold value, and the other is an upper limit threshold value which is greater than the lower limit threshold value. The relay apparatus 12 has a switch control flag for controlling the switching between FIFO and FILO.

First, suppose that data stored in the buffer falls below the lower limit threshold value; the switch control flag is reset; and the data output mode is FIFO. If the data stored in the buffer exceeds the lower limit threshold value in that state, the relay apparatus 12 does not change the data output mode and keeps the FIFO mode. The switch control flag is also left reset.

When the data stored in the buffer exceeds the upper limit threshold value, the relay apparatus 12 switches the data output mode to FILO. In this case, the relay apparatus 12 sets the switch control flag.

When the data exceeds the upper limit threshold value, if the switch control flag is set, the relay apparatus 12 maintains the FILO mode. More specifically, the relay apparatus 12 keeps the FILO mode if the data stored in the buffer exceeds the upper limit threshold value again without falling below the lower limit threshold value.

When the data stored in the buffer falls below the lower limit threshold value, if the switch control flag is set, the relay apparatus 12 discards the data stored in the buffer, not exceeding the lower threshold value, and resets the switch control flag. In that case, data not exceeding the lower limit threshold value at (B) in FIG. 4 is discarded.

When the data stored in the buffer falls below the lower limit threshold value, if the switch control flag is reset, the relay apparatus 12 maintains the FIFO mode. More specifically, if the data in the buffer exceeds the lower limit threshold value but does not exceed the upper limit threshold value, the FIFO mode is maintained.

The amount of data that jams in the relay apparatus 12 is determined by the transmission rate of the relay apparatus 12, and data exceeding the upper limit threshold value of the buffer indicates that a given delay has occurred in data transmission. Accordingly, the upper limit threshold value of the buffer is specified so that the buffer stores data not less than the amount at which the receiving apparatus becomes unable to permit data delay (unable to reproduce data). When the data exceeds the upper limit threshold value, the relay apparatus 12 switches the buffer to the FILO mode so that the receiving apparatus can reproduce data appropriately.

The lower limit threshold value indicates the data to be discarded. If the data exceeds the upper limit threshold value once, in other words, if the given data delay occurs, the data not exceeding the lower limit threshold value is considered to be late for the reproduction timing in the receiving apparatus and is decided as unnecessary data in the receiving apparatus. Therefore, the lower limit threshold value is set to the amount of data that is surely discarded by the receiving apparatus. By discarding old data not exceeding the lower limit threshold value, the relay apparatus 12 avoids the continuation of the inability to reproduce data in the receiving apparatus.

The upper limit threshold value and the lower limit threshold value are specified for the purpose of absorbing fluctuation in data transmission processing by the relay apparatus. If data temporarily stored in the buffer exceeds the upper limit threshold value largely, for example, all data not exceeding the upper limit threshold value becomes data that is late for the reproduction timing in the receiving apparatus and that can be discarded. If the data temporarily stored in the buffer slightly exceeds the upper limit threshold value, some data can still be in time for the reproduction timing in the receiving apparatus. If the upper limit threshold value and the lower limit threshold value are the same value (if one threshold value is provided), even when the data temporarily stored in the buffer exceeds the threshold slightly, all data not exceeding the threshold value is discarded. If the upper limit threshold value and the lower limit threshold value are provided separately, when the data exceeds the upper limit threshold value, only the data not exceeding the lower threshold value is discarded, and data between the lower limit threshold value and the upper limit threshold value is sent to the receiving apparatus as data that could be reproduced. When it becomes impossible to reproduce the data, the receiving apparatus will discard the data.

The lower limit threshold value and the upper limit threshold value can be the same value, of course. In that case, however, data that could be reproduced, between the lower threshold value and the upper limit threshold value, will not be sent to the receiving apparatus, as described earlier. Nevertheless, the continuation of the inability to reproduce data in the receiving apparatus can be avoided.

FIG. 5 is a view illustrating the discarding of data. The figure indicates data 31 to be stored temporarily in the buffer of the relay apparatus 12. Suppose that the oldest data in the data 31 temporarily stored in the buffer in FIG. 5 is data '1' at the bottom. FIG. 5 indicates also data 32 representing the timing of transmission from the relay apparatus 12 to the receiving apparatus and data 33 representing the timing at which the receiving apparatus can perform appropriate reproduction.

Suppose that congestion has caused a data delay in the relay apparatus 12, and the data 32 is sent to the receiving apparatus with the delay indicated by an arrow A11.

When the data temporarily stored in the buffer exceeds the upper limit threshold value, the relay apparatus 12 switches the data output mode from FIFO to FILO. The relay apparatus 12 then continues storing data in FILO until the data stored in the buffer falls below the lower limit threshold value.

In the example illustrated in FIG. 5, since the data 31 temporarily stored in the buffer exceeds the upper limit threshold value, the relay apparatus 12 sends the data 31 temporarily stored in the buffer, in FILO to the receiving apparatus. Like the data 32, the data 31 stored in the buffer will be sent in the order of '8,' '7,' '6,' and so on. In FIFO, the data 31 would be sent in the order of '1,' '2,' '3,' and so on.

The data 31 temporarily stored in the buffer decreases as it is sent to the receiving apparatus. When the data 31 stored in the buffer falls below the lower limit threshold value, the relay apparatus 12 discards the data 31 not exceeding the lower limit threshold value. More specifically, the relay apparatus 12 discards data '4' to '1' (data shaded in FIG. 5) of the data 32 and does not send data '4' to '1' to the receiving apparatus.

An arrow A12 in FIG. 5 indicates a permissible delay amount with which the receiving apparatus can reproduce data appropriately. If the receiving apparatus can receive data '1,' '2,' to '8' sent from the relay apparatus 12 earlier than the timing of the data '1,' '2,' to '8' of the data 33 at least, the receiving apparatus can reproduce data '1,' '2,' to '8' appropriately.

Data '8' of the data 32 is sent to the receiving apparatus earlier than data '8' of the data 33. Accordingly, the receiving apparatus can reproduce data '8' appropriately. Data '7' of the data 32 is also sent to the receiving apparatus earlier than data '7' of the data 33. Accordingly, the receiving apparatus can reproduce data '7' appropriately. Data '6' of the data 32 is sent to the receiving apparatus at the same time as data '6' of the data 33. Accordingly, the receiving apparatus can reproduce data '6' appropriately. Actually, wireless transmission takes time, which is ignored here.

Data '5' of the data 32 is sent to the receiving apparatus later than data '5' of the data 33. Accordingly, the receiving apparatus cannot reproduce data '5' appropriately and will discard it. Data '4' to '1' is discarded by the relay apparatus 12 and will not be sent to the receiving apparatus.

FIG. 6 is another view illustrating the discarding of data. FIG. 6 differs from FIG. 5 in that stored data exceeds largely the upper limit threshold value of the buffer, and the operation is the same as that for FIG. 5.

FIG. 6 indicates data 41 temporarily stored in the buffer of the relay apparatus 12. Suppose that the oldest data in the data 41 temporarily stored in the buffer in FIG. 6 is data '1' at the bottom. FIG. 6 also indicates data 42 representing the transmission timing from the relay apparatus 12 to the receiving apparatus and data 43 representing the timing at which the receiving apparatus can perform appropriate reproduction.

Suppose that congestion has caused a data delay in the relay apparatus 12, and the data 42 is sent to the receiving apparatus with the delay indicated by an arrow A21.

When the data temporarily stored in the buffer exceeds the upper limit threshold value, the relay apparatus 12 switches the data output mode from FIFO to FILO. Then, the relay apparatus 12 continues storing data in FILO until the data stored in the buffer falls below the lower limit threshold value.

In the example illustrated in FIG. 6, since the data 41 temporarily stored in the buffer exceeds the upper limit threshold value, the relay apparatus 12 sends the data 41 temporarily stored in the buffer, in FILO to the receiving apparatus. Accordingly, like the data 42, the data 41 stored in the buffer will be sent in the order of '11,' '10,' '9,' and so on. In the FIFO mode, the data 41 will be sent in the order of '1,' '2,' '3,' and so on.

The data 41 temporarily stored in the buffer decreases as it is sent to the receiving apparatus. When the data 41 stored in the buffer falls below the lower limit threshold value, the relay apparatus 12 discards the data 41 not exceeding the lower limit threshold value. More specifically, the relay apparatus 12 discards data '4' to '1' (data '3' to '1' is omitted in FIG. 6) of the data 42 and does not send data '4' to '1' (shaded data in FIG. 6) to the receiving apparatus.

An arrow A22 in FIG. 6 indicates a permissible delay amount with which the receiving apparatus can reproduce data appropriately. If the receiving apparatus can receive data '1,' '2,' to '11' sent from the relay apparatus 12 earlier than the timing of data '1,' '2,' to '11' of the data 43 at least, the receiving apparatus can reproduce data '1,' '2,' to '11' appropriately.

Data '11' of the data 42 is sent to the receiving apparatus earlier than data '11' of the data 43. Accordingly, data '11' can be reproduced appropriately by the receiving apparatus. Data '10' of the data 42 is also sent to the receiving apparatus earlier than data '10' of the data 43. Accordingly, data '10' can be reproduced appropriately by the receiving apparatus. Likewise, data '8' of the data 42 is sent to the receiving apparatus earlier than data '8' of the data 43. Accordingly, data '8' can be reproduced appropriately by the receiving apparatus.

Data '7' of the data 42 is sent to the receiving apparatus later than data '7' of the data 43. Accordingly, data '7' cannot be reproduced appropriately by the receiving apparatus and will be discarded by the receiving apparatus. Likewise, data '6' and '5' is sent to the receiving apparatus, cannot be reproduced appropriately by the receiving apparatus, and will be discarded by the receiving apparatus. Data '4' to '1' (just data '4' is indicated in the data 42 in FIG. 6) is discarded by the relay apparatus 12 and will not be sent to the receiving apparatus.

The conventional relay apparatus keeps sending data in FIFO. More specifically, the data 41 is sent in the order of '1,' '2,' . . . '11.' In that case, data '1,' '2,' . . . '11' is late for the reproduction time in the receiving apparatus and will not be reproduced by the receiving apparatus. Data subsequent to data '11' is also late for the reproduction time in the receiving apparatus, and the state in which data cannot be reproduced continues.

The relay apparatus 12, however, switches the data output mode of the buffer from FIFO to FILO, sends data, and discards old data that does not exceed the lower limit threshold value and that will not be reproduced. This can prevent the inability to reproduce data in the receiving apparatus from continuing.

FIG. 7 is a block diagram of the relay apparatus. The relay apparatus 12 includes a receiving unit 51, a data storage unit 52, a jam monitoring unit 53, a threshold value setting unit 54, and a sending unit 55.

The receiving unit 51 outputs data received from a network, to the data storage unit 52. The data received from the network is real-time data sent from a media server, for example.

The data storage unit 52 temporarily stores the data output from the receiving unit 51 and outputs it to the sending unit 55. The data storage unit 52 is a buffer and temporarily stores the data output from the receiving unit 51 in FIFO or FILO.

The data storage unit 52 switches between FIFO and FILO in accordance with an instruction from the jam monitoring unit 53. The data storage unit 52 specifies an upper limit threshold value and a lower limit threshold value on the basis of values given from the threshold value setting unit 54 and, if the stored data exceeds the upper limit threshold value or falls below the lower limit threshold value, reports the fact to the jam monitoring unit 53.

The jam monitoring unit 53 monitors the data jam state in the data storage unit 52. In the initial state, the data output mode of the data storage unit 52 is set to FIFO, and the switch control flag is reset. When a report indicating that the temporarily stored data has exceeded the upper limit threshold value is received from the data storage unit 52, the jam monitoring unit 53 sets the switch control flag. The jam monitoring unit 53 instructs the data storage unit 52 to switch the data output mode from FIFO to FILO.

When a report indicating that the temporarily stored data has fallen below the lower limit threshold value is received from the data storage unit 52, if the switch control flag is set, the jam monitoring unit 53 reports the fact to the data storage unit 52. This causes the data storage unit 52 to discard the data not exceeding the lower limit threshold value. The jam monitoring unit 53 switches the data output mode of the buffer of the data storage unit 52 from FILO to FIFO and resets the switch control flag.

If the session is specified for multimedia stream data, the threshold value setting unit 54 reports an upper limit threshold value and a lower limit threshold value suitable for the transmission rate, to the data storage unit 52. For example, the threshold value setting unit 54 has a table and stores, for each transmission rate, the upper limit threshold value and the lower limit threshold value determined as explained with FIG. 4. The sending apparatus receives feedback information from the receiving apparatus by a receiver report (RR) of the Real-time Transfer Control Protocol (RTCP), analyzes it, and can change the transmission rate.

The sending unit 55 sends the data output from the data storage unit 52, to the receiving apparatus.

FIG. 8 is a flowchart illustrating an operation of switching the buffer data output mode when data is received. The relay apparatus 12 switches the buffer data output mode as described below.

In step S1, the relay apparatus 12 receives data from the network.

In step S2, the relay apparatus 12 determines whether data temporarily stored in the buffer has exceeded the upper limit threshold value. If the data temporarily stored in the buffer has exceeded the upper limit threshold value, the processing goes to step S3. If the data temporarily stored in the buffer has not exceeded the upper limit threshold value, the processing ends.

In step S3, the relay apparatus 12 checks whether the switch control flag is set or reset. More specifically, the relay apparatus 12 checks whether the data in the buffer exceeded the upper limit threshold value before. If the switch control flag is set, that is, if the buffer data exceeded the upper limit threshold value before, the processing ends. If the switch control flag is reset, that is, if the buffer data did not exceed the upper limit threshold value before, the processing goes to step S4.

In step S4, the relay apparatus 12 switches the data output mode from FIFO to FILO.

In step S5, the relay apparatus 12 sets the switch control flag.

FIG. 9 is a flowchart illustrating an operation of switching the buffer data output mode when data is sent. The relay apparatus 12 switches the buffer data output mode, as described below.

In step S11, the relay apparatus 12 sends data to the network (receiving apparatus).

In step S12, the relay apparatus 12 determines whether the data temporarily stored in the buffer has fallen below the lower limit threshold value. If the data temporarily stored in the buffer has fallen below the lower limit threshold value, the processing goes to step S13. If the data temporarily stored in the buffer has not fallen below the lower limit threshold value, the processing ends.

In step S13, the relay apparatus 12 checks whether the switch control flag is set or reset. More specifically, the relay apparatus 12 checks whether the data in the buffer once exceeded the upper limit threshold value and then fell below the lower limit threshold value. If the switch control flag is set, that is, if the data in the buffer once exceeded the upper limit threshold value and then fell below the lower limit threshold value, the processing goes to step S14. If the switch control flag is reset, that is, if the data in the buffer fell below the lower limit threshold value without exceeding the upper limit threshold value before, the processing ends.

In step S14, the relay apparatus 12 switches the data output mode from FILO to FIFO.

In step S15, the relay apparatus 12 resets the switch control flag.

As described above, when the data temporarily stored in the buffer exceeds the upper limit threshold value, the relay apparatus 12 switches the data output mode to FILO. Then, when the data falls below the lower limit threshold value, the data output mode is switched to FIFO, and the data not exceeding the lower limit threshold value is discarded. This makes it possible to avoid the continuation of the inability to reproduce data in the receiving apparatus.

The discarding of the old data not exceeding the lower limit threshold value protects data that can be reproduced by the receiving apparatus from being discarded by tail dropping.

The lower limit threshold value and the upper limit threshold value provided separately allow fluctuation in data transmission processing of the relay apparatus 12 to be absorbed.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

According to the embodiments, the output mode may be changed, depending on the buffer amount.

What is claimed is:

1. A relay apparatus for relaying data on a network, comprising:
    a buffer for storing the data temporarily; and
    an output mode switching unit configured to switch the output order in which the data is output from the buffer in accordance with the storage amount of the data temporarily stored in the buffer;
    wherein switching by the output mode switching unit includes switching between FIFO (a first-in-first-out buffering type) and FILO (a first-in-last-out buffering type);
    wherein the buffer has a lower limit threshold value and an upper limit threshold value which is greater than the lower limit threshold value;
    wherein the output mode switching unit switches the output mode to FILO when the data temporarily stored in the buffer exceeds the upper limit threshold value and switches the output mode to FIFO when the data temporarily stored in the buffer falls below the lower limit threshold value;
    wherein, when the data falls below the lower limit threshold value after exceeding the upper limit threshold value, the output mode switching unit discards data not exceeding the lower limit threshold value;
    wherein the output mode switching unit has a flag for determining whether the data falls below the lower limit threshold value after exceeding the upper limit threshold value;
    wherein the output mode switching unit sets the flag when the data exceeds the upper limit threshold value and then resets the flag when the data falls below the lower limit threshold value;
    and wherein, when the data falls below the lower limit threshold value, when the flag is set, the output mode switching unit discards the data not exceeding the lower limit threshold value.

2. The relay apparatus according to claim 1, wherein the upper limit threshold value is specified not lower than an amount at which, when the data is delayed, a receiving apparatus for receiving the data becomes unable to permit the data delay.

3. The relay apparatus according to claim 1, wherein the lower limit threshold value is specified to an amount that is surely determined to be unnecessary by a receiving apparatus for receiving the data when the data is delayed.

4. The relay apparatus according to claim 1, wherein, when the transmission rate of the data is changed, the lower limit threshold value and the upper limit threshold value are changed in accordance with the transmission rate.

5. The relay apparatus according to claim 1, wherein the data is streaming data.

6. An output control method of a relay apparatus for relaying data on a network,
   switching, by the output mode switching unit, the order of data output from a buffer, depending on the storage amount of data stored in the buffer;
   wherein switching by the output mode switching unit includes switching between FIFO (a first-in-first-out buffering type) and FILO (a first-in-last-out buffering type);
   wherein the buffer has a lower limit threshold value and an upper limit threshold value which is greater than the lower limit threshold value;
   wherein the output mode switching unit switches the output mode to FILO when the data temporarily stored in the buffer exceeds the upper limit threshold value and switches the output mode to FIFO when the data temporarily stored in the buffer falls below the lower limit threshold value;
   wherein, when the data falls below the lower limit threshold value after exceeding the upper limit threshold value, the output mode switching unit discards data not exceeding the lower limit threshold value;
   wherein the output mode switching unit has a flag for determining whether the data falls below the lower limit threshold value after exceeding the upper limit threshold value;
   wherein the output mode switching unit sets the flag when the data exceeds the upper limit threshold value and then resets the flag when the data falls below the lower limit threshold value;
   and wherein, when the data falls below the lower limit threshold value, when the flag is set, the output mode switching unit discards the data not exceeding the lower limit threshold value.

* * * * *